United States Patent [19]

Himeno et al.

[11] Patent Number: 4,985,545

[45] Date of Patent: Jan. 15, 1991

[54] WATER-SOLUBLE FORMAZAN COLORANT CONTAINING REACTIVE GROUP AND METHOD OF DYEING BY ITS USE

[75] Inventors: Kiyoshi Himeno, Munakata; Toshio Hihara, Kitakyushu; Kanzi Shimizu, Kitakysuhu; Yukiharu Shimizu, Kitakyushu, all of Japan

[73] Assignee: Mitsubishi Kasei Corporation, Tokyo, Japan

[21] Appl. No.: 243,310

[22] Filed: Aug. 15, 1988

[30] Foreign Application Priority Data

Jan. 5, 1987 [JP] Japan ............................... 62-53
Mar. 2, 1987 [JP] Japan ............................... 62-47344

[51] Int. Cl.$^5$ ................... C09B 62/503; D06P 1/384
[52] U.S. Cl. ........................... 534/618; 534/612; 534/652; 534/887; 552/245
[58] Field of Search .................... 534/618, 652

[56] References Cited

U.S. PATENT DOCUMENTS 3,910,877 10/1975 Prichard et al. ............... 534/652
4,720,542 1/1988 Omura et al. .................. 534/618

FOREIGN PATENT DOCUMENTS

| 76782 | 4/1983 | European Pat. Off. | 534/618 |
| 219232 | 4/1987 | European Pat. Off. | 534/618 |
| 46-41432 | 12/1971 | Japan | 534/618 |
| 47-23708 | 7/1972 | Japan | 534/618 |
| 58-71957 | 4/1983 | Japan | 534/618 |
| 59-15451 | 2/1984 | Japan | 534/618 |
| 60-90264 | 5/1985 | Japan | 534/618 |

OTHER PUBLICATIONS

Mukerjee et al., Chemical Abstracts, vol. 96, No. 65524a, (1982).
Himeno, Chemical Abstracts, vol. 110, No. 11652h, (1989).
Omura, Chemical Abstracts, vol. 108, No. 39638n, (1988).

Primary Examiner—Floyd D. Higel
Assistant Examiner—Fiona T. Powers

Attorney, Agent, or Firm—Oblon, Spivak, McClelland, Maier & Neustadt

[57] ABSTRACT

A water-soluble formazan colorant, which is represented by the following general formula (I) in the form of free acid:

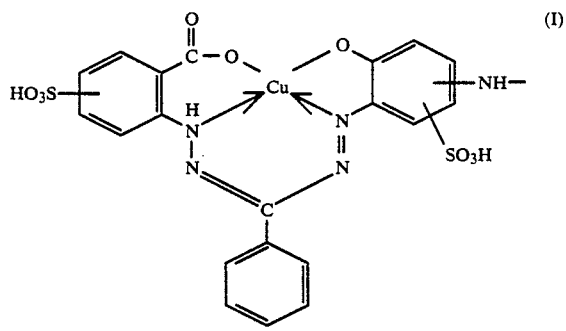

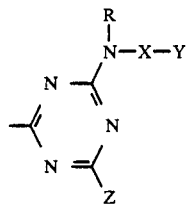

(where: R represents a hydrogen atom or a lower alkyl group which may be substituted; X denotes a phenylene group or a naphthylene group which may be substituted; Y indicates —SO$_2$CH═CH$_2$ group or —SO$_2$C$_2$H$_4$W group wherein W represents a group to be eliminated by the action of alkali; and Z designates a lower alkylamino group, a phenylamino group or a naphthylamino group, having one or two water-soluble groups selected from the group consisting of hydroxyl group, sulfonic acid group and carboxylic acid group); and a method of dyeing by use of the colorant. The colorant is used to dye cellulosic and nitrogen-containing fibers in blue shades with excellent reactive fixing properties.

4 Claims, No Drawings

WATER-SOLUBLE FORMAZAN COLORANT CONTAINING REACTIVE GROUP AND METHOD OF DYEING BY ITS USE

TECHNICAL FIELD

This invention relates to blue-type water-soluble formazan colorant having a new chemical structure and a method of dyeing by use of such colorant. More particularly, it is concerned with formazan colorant having one vinyl sulfone reactive group in the chemical structure and being excellent in the reactive fixing property to cellulosic and nitrogen-containing fibers in particular, and with a method of dyeing fibers by use of such coloring meatter.

BACKGROUND TECHNOLOGY

In the case of dyeing fibers including cellulosic or nitrogen-containing fibers, use is usually made of water-soluble reactive dyes. For such reactive dye, demands are on those dyes which have excellent levelling property, are capable of dyeing fiber materials to be dyed with high density, and yet prossess favorable color fastness of the dyed articles to various circumstances. The characteristics of such reactive dyes differ delicately by the basic skeletal structure, substituents, reactive groups, and their combination, on account of which there have so far been proposed various structures of the dyes. As the result of this, there have been put into practice at present those dyes which have attained a level of considerable satisfaction.

However, in those dyes having blue type color tone among the reactive dyes, those having generally excellent characteristics have not yet to be found.

For example, there has been known the reactive dyes consisting of formazan type compounds having a structural formula as shown below (vide: Japanese Unexamined Patent Publication No. 4783/1981 and Japanese Unexamined Patent Publication No. 15451/1984).

While these dyes are suitable for use under the ordinary conditions for dyeing cellulosic and nitrogen-containing fibers, they are not satisfactory in every aspect of color fastness to washing, color fastness to perspiration and sun light, and further, acid stability.

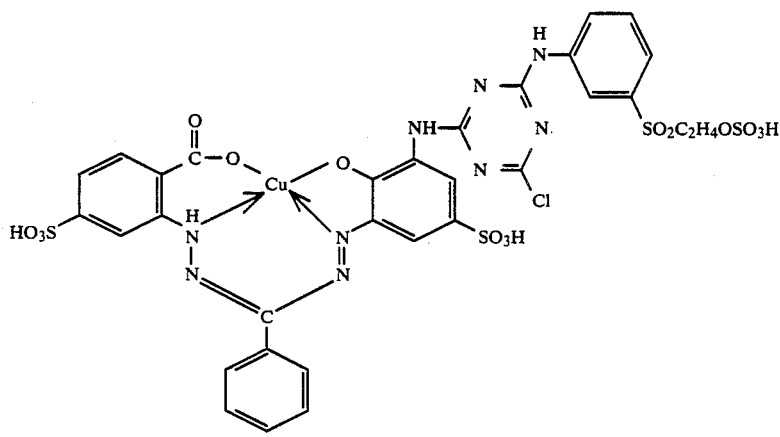

(Japanese Unexamined Patent publication No. 4783/1981)

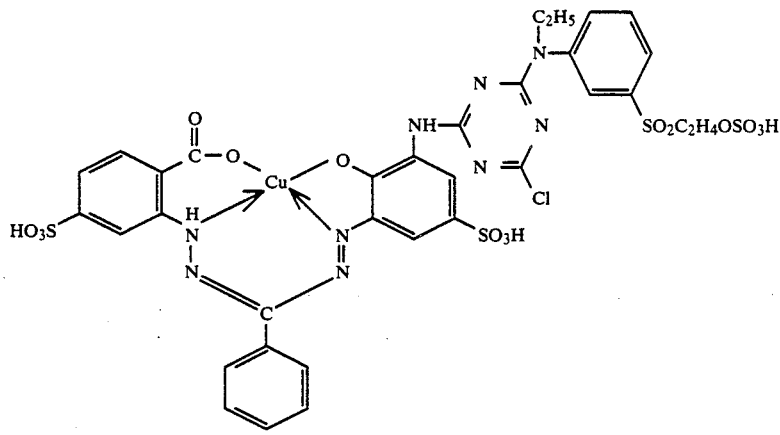

(Japanese Unexamined Patent Publictaion No. 15451/1984)

On the other hand, with diversification of the fiber materials, there have become used blended fibers of, for example, cellulosic fibers and polyester fibers. As the method of dyeing such blended fibers, there has conventionally been adopted a so-called "double-step method", wherein polyester fibers are dyed in advance at a high temperature of 120° C. to 140° C. or so by use of a disperse dye, and then cellulosic fibers are dyed at a low temperature of 60° C. to 70° C. or so by use of a reactive dye. On the other hand, there has recently been proposed a method of dyeing cellulosic fibers and polyester fibers simultaneously in a dye bath at a higher temperature of from 120° C. to 140° C. by a single-bath-and-single-step dyeing method, wherein the reactive dye and the disperse dye are used together. However, when a known reactive dye is used in this dyeing method, the reactive fixing rate of the dye to the cellulosic fibers is low and its build-up property is poor, with the consequence that no favorable dyed article can be obtained. As the reactive dye suitable for such single-bath-and-single-step dyeing method, there have been known those reactive dyes consisting of formazan compound to be represented by the following structural formula (vide: Japanese Unexamined Patent Publication No. 90264/1985). However, even when this reactive dye is used, the dyed article is not satisfactory in percentage exhaustion and build-up property.

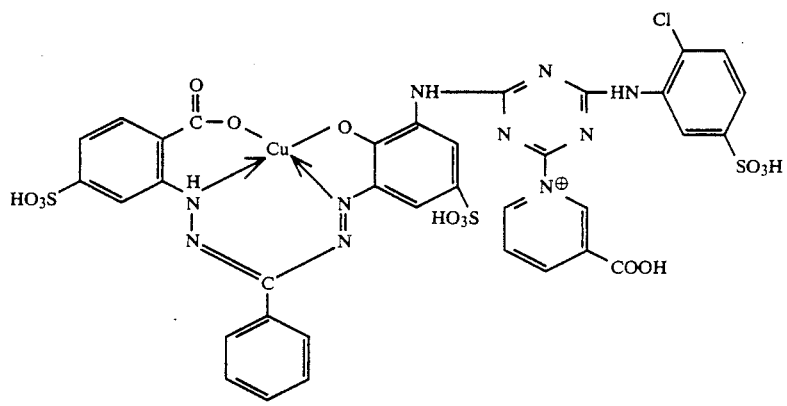

-continued

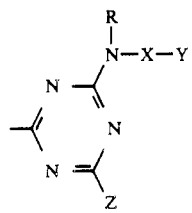

(where: R represents a hydrogen atom or a lower alkyl group which may be substituted; X denotes a phenylene group or a naphthylene group which may be substituted; Y indicates —$SO_2CH{=}CH_2$ group or —$SO_2C_2H_4W$ group wherein W represents a group to be eliminated by the action of alkali; and Z designates a lower alkylamino group, a phenylamino group or a naphthylamino group, having one or two water-soluble groups selected from the group consisting of hydroxyl group, sulfonic acid group and carboxylic acid group).

In the following, the present invention will be described in more detail.

The water-soluble formazan colorant according to the present invention is a compound which has been shown by the above general formula (I), the structural chracteristic of which resides in its having the substituent Z. That is to say, in the present invention, Z should necessarily be a lower alkylamino group, a phenylamino group, or a naphthylamino group having a water-soluble substituent. Since the water-soluble formazan colorant according to the present invention has a particular substituent Z, water-soluble groups are introduced in good balance into the formazan compound as a whole with the result that various desirable effects such as improvement in the color fastness to various circumstances, and others can be exhibited.

In the water-soluble formazan colorant as represented by the above general formula (I), examples of the lower alkyl group as designated by R, which may be substituted, are an unsubstituted alkyl group in straight chain or branched chain having $C_1$ to $C_4$; and a lower alkyl group having $C_1$ to $C_4$ which have been substituted with a hydroxyl gruop, a cyano group, a halogen atom (such as chlorine, bromine or fluorine) or a lower alkoxy group having $C_1$ to $C_2$ such as hydroxymethyl, 2-hydroxyethyl, 2-cyanoethyl, cyanomethyl, 2-chloroethyl or 2-methoxyethyl. Preferably, R denotes a hydrogen atom or an unsubstituted lower alkyl group having $C_1$ to $C_4$.

DISCLOSURE OF THE INVENTION

The present invention has been made in view of the above-mentioned actual circumstances, and its one purpose is to provide a water-soluble colorant which indicates much more excellent reactive fixing rate to the cellulosic fibers and excellent color fastness to various influenece. The other purpose of the present invention is to provide a method of dyeing fiber materials using the water-soluble colorant.

The gist of the present invention resides in the water-soluble formazan colorant represented by the following general formula (I) in the form of free acid, and a method of dyeing fibers by use of this colorant.

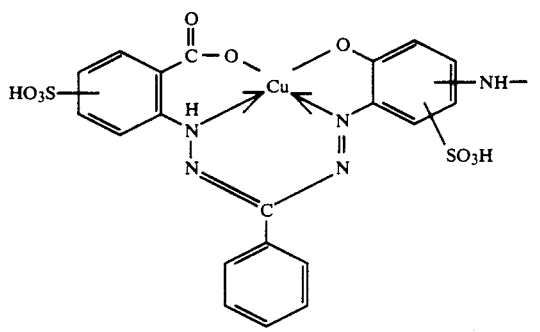
(I)

As the phenylene group or the naphthylene group as represented by X, which may be substituted, there may be exemplified in addition to an unsubstituted phenylene or naphthylene group, a phenylene or naphthylene group which has been substituted with one or two substituents selected from the group consisting of a lower alkyl group having a $C_1$ to $C_4$ such as methyl group, ethyl group, and so forth; a lower alkoxy group having $C_1$ to $C_4$ such as methoxy group, ethoxy group and so forth; a halogen atom such as chlorine, bromine, etc.; and sulfonic acid group. Preferably, X denotes a phenylene group which may be substituted with one or two substituents selected from the group consisting of a lower alkyl group having $C_1$ to $C_4$, a lower alkoxy group having $C_1$ to $C_4$, and a halogen atom.

As specific examples of the group represented by a general formula

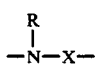

wherein R and X are constituted of those as mentioned above, the following may be listed.

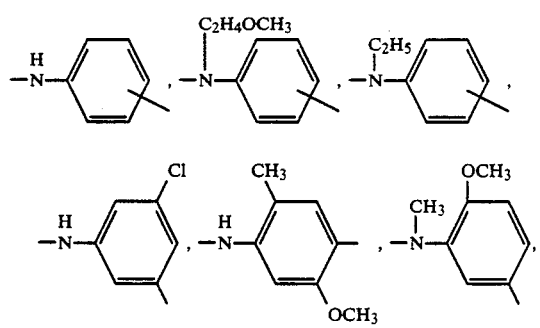

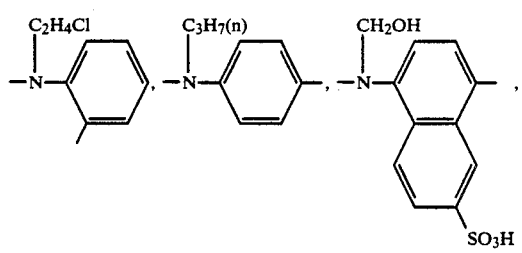

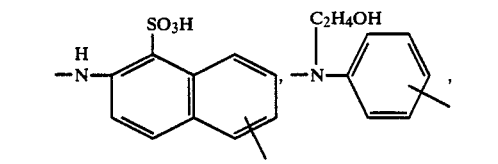

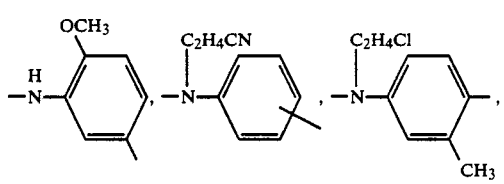

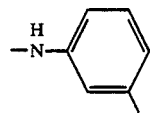

Among these groups,

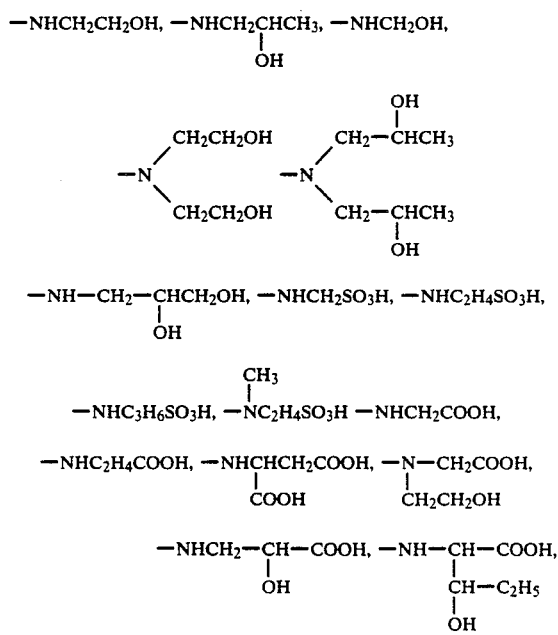

is particularly preferable.

Further, as the group to be represented by W, which is eliminated by the action of alkali, there may usually be exemplified —$OSO_3H$, —$SSO_3H$, —$OPO_3H_2$, —O-$COCH_3$ or a halogen atom such as chlorine, bromine, etc. Of these groups, particularly preferred is —O-$SO_3H$.

The structural characteristic of the water-soluble formazan colorant according to the present invention resides particularly in its having a particular substituent Z, as mentioned in the foregoing. This substituent Z has one or two water-soluble groups selected from the group consisting of hydroxyl group, sulfonic acid group and carboxylic acid group, and, when Z has the water-soluble groups of two or more, they may be either same or different.

The following may be listed as the specific examples of the lower alkylamino group represented by Z, having one or two water-soluble groups selected from the group consisting of hydroxyl group, sulfonic acid group and carboxylic acid group.

—NHCH$_2$CH$_2$OH, —NHCH$_2$CHCH$_3$, —NHCH$_2$OH,
                              |
                              OH $$-N\begin{matrix}CH_2CH_2OH\\CH_2CH_2OH\end{matrix} \quad -N\begin{matrix}CH_2-CHCH_3\\|\\OH\\CH_2-CHCH_3\\|\\OH\end{matrix}$$

—NH—CH$_2$—CHCH$_2$OH, —NHCH$_2$SO$_3$H, —NHC$_2$H$_4$SO$_3$H,
                |
                OH

CH$_3$
                          |
—NHC$_3$H$_6$SO$_3$H, —NC$_2$H$_4$SO$_3$H  —NHCH$_2$COOH,

—NHC$_2$H$_4$COOH, —NHCHCH$_2$COOH, —N—CH$_2$COOH,
                    |                |
                    COOH             CH$_2$CH$_2$OH

—NHCH$_2$—CH—COOH, —NH—CH—COOH,
            |              |
            OH             CH—C$_2$H$_5$
                           |
                           OH

The total number of carbon atoms in the lower alkylamino group having the above-mentioned substituents should preferably range from 1 to 6. Of these lower alkylamino groups, those having $C_1$ to $C_4$ and having one or two sulfonic acid groups, or more particularly a single sulfonic acid group, are particularly preferable.

On the other hand, the following are enumerated as the specific examples of phenylamino or naphthylamino group to be represented by Z and having one or two water-soluble groups selected from the group consisting of hydroxyl group, sulfonic acid group and carboxylic acid group.

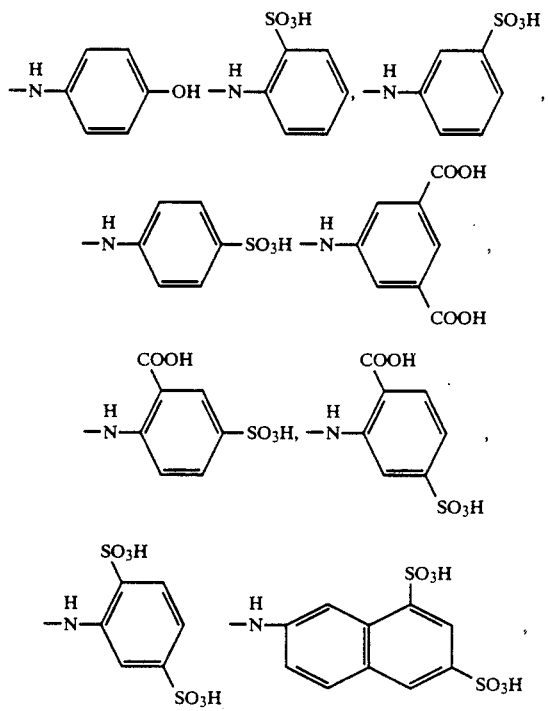

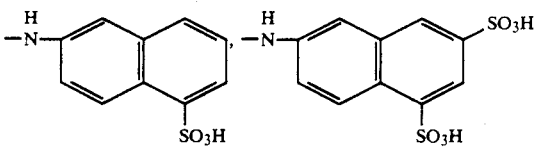

Of the above groups, the phenylamino or naphthylamino group having one or two sulfonic acid groups are preferable, and further, the phenylamino group having one sulfonic acid group is particularly preferable.

The water-soluble formazan colorant according to the present invention, in which Z is the lower alkylamino group having the above-mentioned substituents, is particularly suitable when it is used in the method of dyeing celllulosic fibers or nitrogen-containing fibers singly at a temperature ranging from 40° C. to 100° C. Also, the water-soluble formazan colorant according to the present invention, in which Z is the phenylamino or naphthylamino group having the above-mentioned substituents is particularly suitable when it is used in the method of dyeing blended fibers of cellulosic fibers and polyester fibers at a temperature ranging from 100° C. to 150° C. which is a temperature for dyeing polyester fibers.

The water-soluble formazan colorant according to the present invention exists in the form of free acid or a salt thereof. As the salt, its alkali metal salts and its alkaline earth metal salts are preferred. More particularly, its lithium, sodium or potassium salt is preferred.

Of the water-soluble formazan colorants according to the present invention as represented by the general formula (I) in the foregoing, a colorant which is represented by the following general formula (I-1) in the form of free acid is preferable.

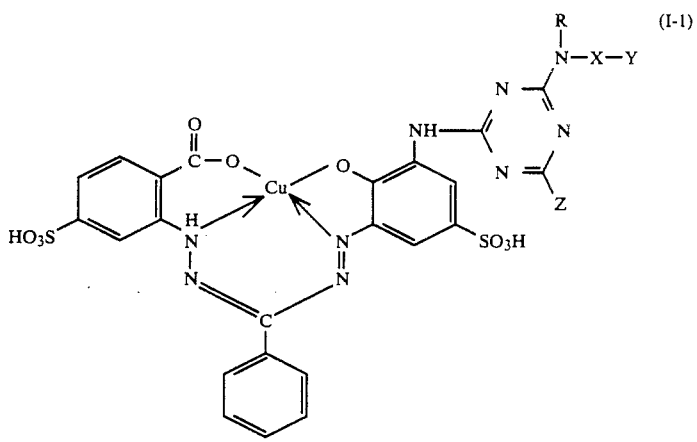

(where R, X, Y and Z are of the same definitions as in the general formula (I) above.)

In the particular, the water-soluble formazan colorant according to the present invention which is suitable for use in the method of dyeing the cellulosic fibers or nitrogen-containing fibers singly at a temperature in a range of from 40° C. to 100° C. is represented by the following general formula (I-2) in the form of free acid.

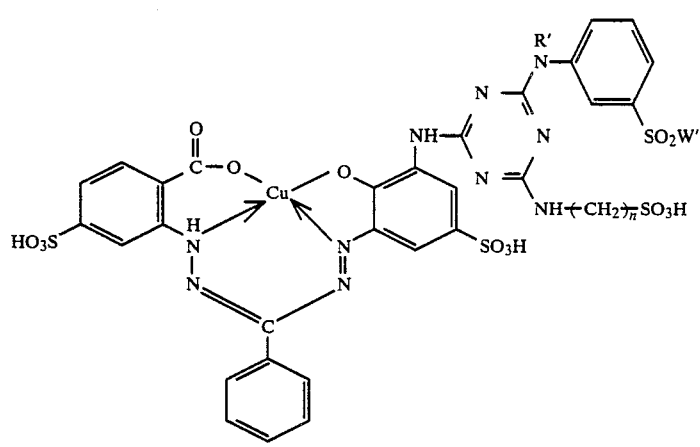

(I-2)

(where R' represents a hydrogen atom, methyl group or ethyl group; W' denotes —CH=CH₂ group or —C₂H₄OSO₃H group; and n is an integer or from 1 to 3.) In the above general formula (I-2), those colorants, in which n is 2, are the most preferable.

On the other hand, the water-soluble formazan colorant according to the present invention which is suitable for use in the method of dyeing the blended fibers of cellulosic and polyester fibers at a temperature in a range of from 100° C. to 150° C. is represented by the following general formula (I-3) in the form of free acid.

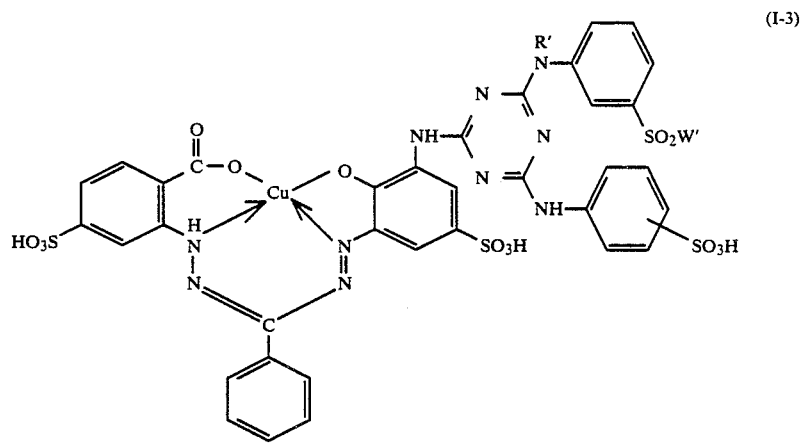

(I-3)

(where R' and W' are of the same definitions as in the above general formula (I-2).)

Of these colorants represented by the above general formula (I-3), a colorant to be represented by the following general formula (I-5) in the form of free acid is the most preferable.

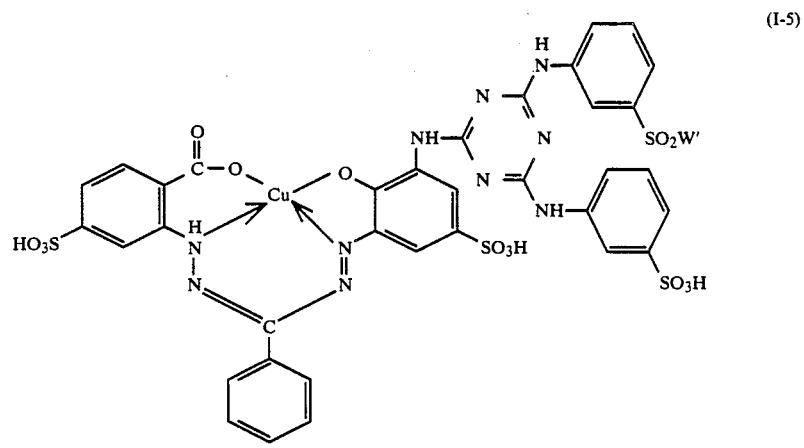

(I-5)

(where W' is of the same definition as in the above general formula (I-2).)

The water-soluble formazan colorant represented by the above general formula (I) can be manufactured in the following manner.

For example, such water-soluble formazan colorant represented by the above general formula (I) is produced by condensation of one molar ratio of a compound to be represented by the following general formula (II)

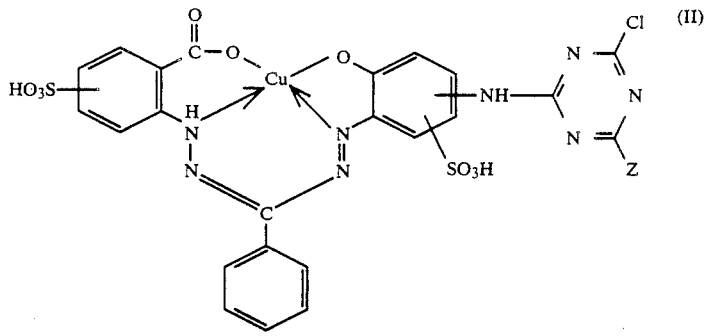

(where Z is of the same definition as in the foregoing); and one molar ratio of a compound to be represented by the following general formula (III).

(where R, X and Y are of the same definitions as in the foregoing).

The water-soluble formazan colorant according to the present invention can be used widely as the dye for dyeing fibers and cloths, the colorant for coloring paper and synthetic resin, and further, the colorant for ink jet printer, etc. In particular, it has excellent suitability as the dyestuff.

In the following explanations will be made as to the method of dyeing.

Fibers to be the object of dyeing by use of the water-soluble formazan colorant according to the present invention as the dyestuff may be cotton, viscose rayon, cupra-ammonium rayon, hemp and other cellulosic fibers, and further nitrogen-containing fibers such as polyamide, wool and silk. Of these fibers, cellulosic fibers are particularly preferable. These fiber materials may safely be blended with, for example, polyester, triacetate, polyacrylonitrile, and others to form blended fibers.

In order to dye these cellulosic or nitrogen-containing fibers by use of the water-soluble formazan colorant according to the present invention as represented by the above general formula (I), a dye bath is usually prepared by adding to the colorant an acid binder consisting of inorganic alkali such as sodium bicarbonate or sodium carbonate, or an organic base such as triethylamine or the like, and, as the case requires, an electrolyte (e.g., sodium chloride or sodium sulfate or like others at a rate of 1 to 150 g/liter or so, more preferably 40 to 80 g/liter, relative to the dye bath, in ordinary case); then the cellulosic fibers are dipped in the dye bath, while heating the bath in a pH value ranging from 8 to 12 at a temperature of from 40° C. to 130° C., more preferably from 50° C. to 100° C., for a period of from 30 to 60 minutes, whereby favorable dyeing can be done.

Moreover, in the case of dyeing blended woven cloths, blended fiber knitted articles, and others, which are manufactured by blending the cellulosic fibers with other fibers e.g. polyester fibers, the water-soluble formazan colorant of the present invention as represented by the foregoing generals formula (I) and any disperse dye as listed in, for example, the Color Index (Third Edition) are added to the above-mentioned dye bath, whereby both cellulosic fibers and the polyester fibers can be simultaneously dyed by the single-bath-and-single-step dyeing method. In this case, it is preferable to maintain the pH value of the dye bath in a range of from 7 to 9, more preferably from 8 to 9. The dyeing temperature may range from 100° C. to 150° C., more preferably from 120° C. to 140° C.

Furthermore, when the blended woven cloths, blended fiber knitted articles, etc. as mentioned above are to be dyed, it may be feasible to apply a single-bath-and-double-step dyeing method, as has so far been adopted, wherein either one of the fibers is dyed at first, and thereafter the other fibers are dyed in the same dye bath. It is further possible to adopt a double bath dyeing method, wherein the cellulosic fibers and the other fibers are dyed in separate dye bath by combining the method of dyeing with use of the water-soluble formazan colorant of the present invention and the method of dyeing the other fibers than the cellulosic fibers.

As the method of dyeing fibers, in which the colorant according to the present invention is used, the dip dyeing is particularly suited. In addition, the colorant according to the present invention may also be applicable to other methods of dyeing such as cold pad batch method, pad steam method, printing method wherein vinyl sulfone type reactive dyes can be utilized.

Incidentally, at the time of dyeing, for example, the vinyl sulfone type reactive group ($-SO_2C_2H_4OSO_3H$) in the structure of the water-soluble formazan colorant according to the present invention is hydrolyzed into $-SO_2CH=CH_2$ which reacts with the fibers.

BEST MODE TO PRACTICE THE INVENTION

In the following, more concrete explanations of the water-solube formazan colorant of the present invention and the method of dyeing by use of the colorant will be given in reference to specific examples, although the present invention will not be limited to these examples alone.

EXAMPLE 1

Example of manufacture 1 molar ratio of a formazan compound represented by the following structural formula in the form of free acid:

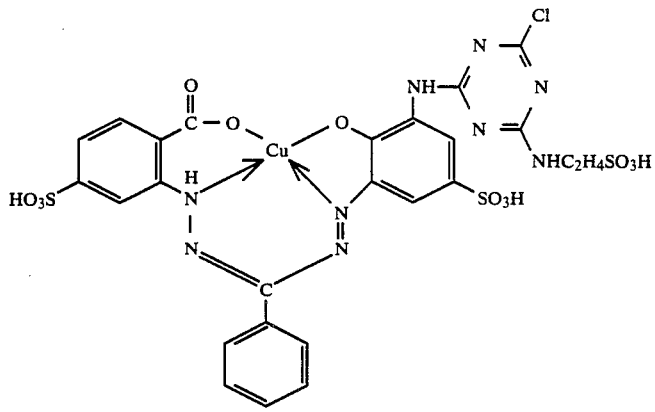

and 1 molar ratio of a compound represented by the following structural formula:

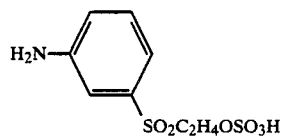

were subjected to condensation in an aqueous solvent at a temperature ranging from 80° C. to 90° C. and with a pH value of from 4 to 6. Thereafter, the condensation product was subjected to salting out with sodium chloride to obtain a water-soluble formazan colorant having the following structural formula (in the form of free acid) and an analytical value obtained by the visible light absorption.

of water, to which 10 g of Glauber's salt was dissolved to prepare a dye bath. Into this dye bath, 10 g of unmercerized cotton knitted fabric was immersed, while raising the temperature of the dye bath to 60° C. in 30 minutes. Subsequently, 3.0 g of sodium carbonate was added thereto and the dyeing operation was carried out for one hour at 60° C., followed by rinsing, soaping, rinsing and drying of the dyed article, whereby the dyed article in blue was obtained.

The dyed article obtained with use of this dyestuff was uniformly and densely dyed. Its color fastness to light was excellent, which was as high as "grade 6" (in accordance with JIS L-0842), its color fastness to washing (in accordance with JIS L-0844 A-4 Method) was very superior, which was as high as "grade 5⁻" (cotton soiling), and its color fastness to perspiration and sunlight was as high as "grade 5⁻" (in accordance with JIS L-0888, alkali).

EXAMPLE 2

0.2 g of the water-soluble formazan colorant to be represented by the following structural formula (in the form of free acid) was dissolved in 200 ml of water, to which 8 g of Glauber's salt was dissolved to prepare the dye bath.

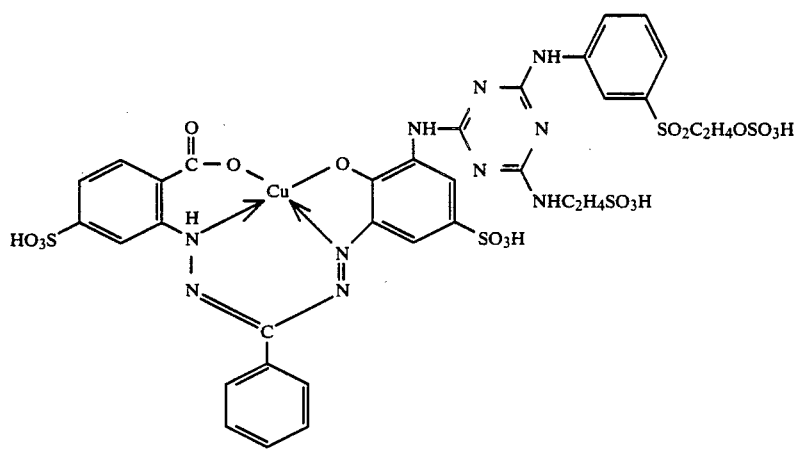

λ max (in water): 609 nm

Example of dyeing 0.2 g of the water-soluble formazan colorant obtained in the above-mentioned manner was dissolved in 200 ml

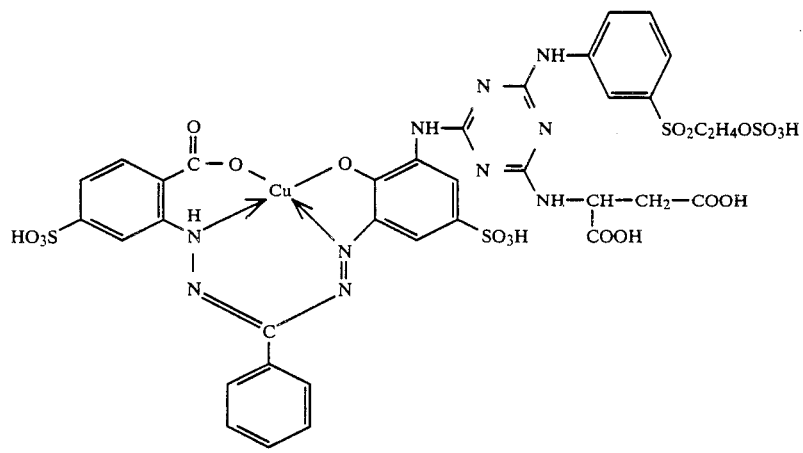

λ max (in water): 610 nm

Into this dye bath, there was immersed 10 g of unmercerized cotton knitted fabric, while raising the temperature to 50° C. in 30 minutes. Subsequently, 3.0 g of sodium carbonate was added to the dye bath and the dyeing was carried out for one hour at 50° C., followed by rinsing, soaping, rinsing and drying of the dyed article, whereby the dyed article in blue was obtained.

The dyed article obtained with use of this dyestuff was uniformly and densely dyed. Its color fastness to light was excellent, which was as high as "grade 6" (in accordance with JIS L-0842) and its color fastness to washing (in accordance with JIS L-0844, A-4 Method) was very superior, which was as high as "grade 5⁻" (cotton soiling).

By the way, the formazan colorant used in this example was manufactured in accordance with Example 1 above.

EXAMPLE 3 AND COMPARATIVE EXAMPLE 1

The same procedures as in Example 1 above were followed with the exception that 0.2 g and 0.1 g respectively of the below-mentioned formazan colorants were used, whereby the dyed articles in blue were obtained.

EXAMPLE 3

The colorant used corresponds to that as used in Example 1 above, which is as follows.

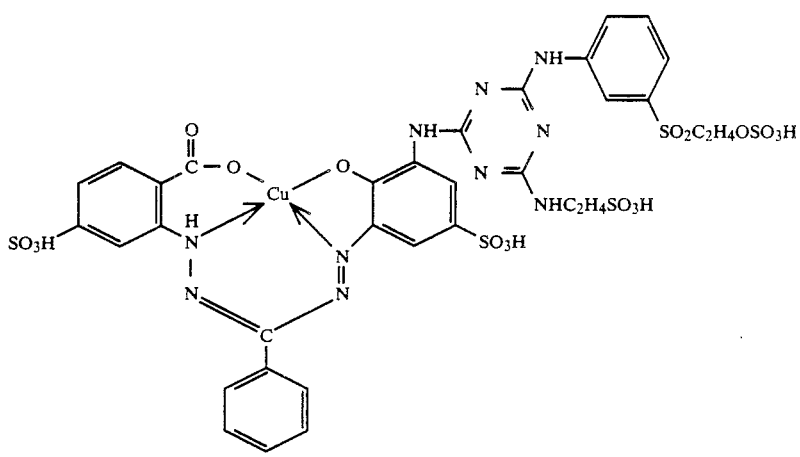

COMPARATIVE EXAMPLE 1

The colorant used corresponds to a compound of Example 1 in Japanese Unexmained Patent Publication No. 4783/1981, which is as follows.

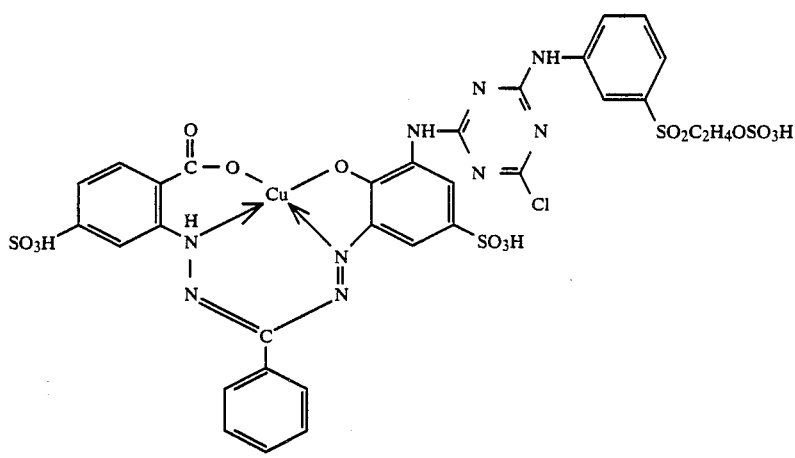

On these dyed cloths, measurements were conducted on their surface reflectance by means of a color difference meter to thereby find out the surface density, and then the build-up property of the dyestuff on these dyed cloths was calculated on the basis of the following equation. Furthermore, the color fastness to washing (JIS L-0844, A-4 Method), the color fastness to perspiration and sunlight (JIS L-0888, alkali) and the color fastness to acid stability were examined.

As for evaluation of the color fastness to washing, use was made of dyed cloths which had been dyed with use of 1.0 g of each formazan colorant. As for evaluation of the color fastness to perspiration and sunlight and the color fastness to acid stability, use was made of dyed cloths which had been dyed with use of 0.2 g of each formazan colorant.

The method of testing the color fastness to acid stability is as follows: the dyed cloth was immersed in a 10 g/liter aqueous solution of lactic acid, then pulled up from the solution and squeezed at a squeezing ratio of 80%, followed by drying the same for three minutes at 120° C.

After this, test for color fastness to water was conducted in accordance with JIS L-0846, which was evaluated in terms of a degree of soiling of cotton white cloth. The test results are as shown in Table 1 below.

TABLE 1

|  | Build-up property (%) *1 | Color fastness to washing (Grade) | Color fastness to Perspiration and sunlight (Grade) | Color fastness to acid stability (Grade) |
|---|---|---|---|---|
| Example 3 | 385 | 4–5+ | 5− | 5− |
| Comparative | 392 | 4+ | 4–5− | 4− |

TABLE 1-continued

|  | Build-up property (%) *1 | Color fastness to washing (Grade) | Color fastness to Perspiration and sunlight (Grade) | Color fastness to acid stability (Grade) |
|---|---|---|---|---|
| Example 1 |  |  |  |  |

$$*1: \text{Build-up property} = \frac{\text{Surface density of dyed cloth obtained by using 1.0 g of formazan colorant}}{\text{Surface density of dyed cloth obtained by using 0.2 g of formazan colorant}} \times 100$$

(a theoretical value = 500%)

As is apparent from the results shown in Table 1 above, the colorant according to the present invention, in spite of its having only one vinyl sulfone type reactive group, exhibits as equal the build-up property as that of the dyestuff of the Comparative Example 1 containing therein two reactive groups of the vinyl sulfone type reactive group and an active halogen atom, and yet it is also superior in its color fastness to various circumstances.

EXAMPLE 4

The formazan colorants (they are represented in the form of free acids) of the present invention as shown in Table 2 below were synthesized in accordance with the method of Example 1 above, and cotton cloth was dyed with use of these colorants in the same way as mentioned in Example 1 above, whereupon uniform and dense dyeing could be attained. The color fastness to light and the color fastness to washing were also favorable, which attained "grade 6" and "grade 5−", respectively.

TABLE 2

General formula

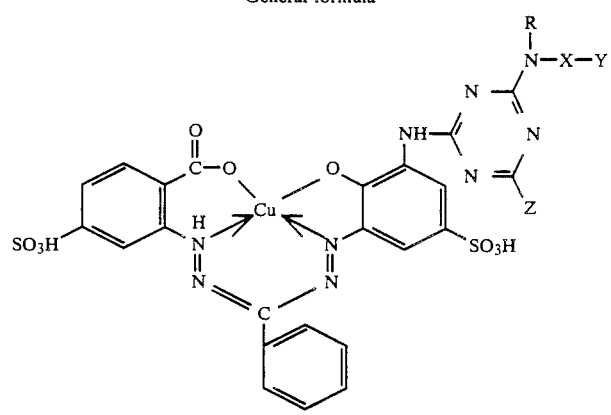

| Examples | −Z | −R | −X−Y | Color tone of cotton cloth | λ max nm(in water) |
|---|---|---|---|---|---|
| 4-1 | −NHCH$_2$−CH(OH)−COOH | −H | 3-(SO$_2$C$_2$H$_4$OSO$_3$H)-phenyl | blue | 610 |
| 4-2 | −NH−CH$_2$CH(OH)CH$_2$OH | " | " | " | " |
| 4-3 | −NHCH$_2$COOH | " | " | " | " |
| 4-4 | −N(CH$_2$COOH)(CH$_2$CH$_2$OH) | −H | 3-(SO$_2$C$_2$H$_4$OSO$_3$H)-phenyl | blue | 610 |
| 4-5 | −N(C$_2$H$_4$OH)$_2$ | " | 2-(SO$_2$C$_2$H$_4$OSO$_3$H)-phenyl | " | " |
| 4-6 | −NHC$_2$H$_4$OH | −C$_2$H$_5$ | 4-(SO$_2$C$_2$H$_4$Cl)-phenyl | " | 609 |
| 4-7 | −NHCH$_2$−CH(OH)CH$_3$ | −CH$_3$ | 4-(SO$_2$C$_2$H$_4$OSO$_3$H)-phenyl | blue | 609 |
| 4-8 | −NHCH$_2$OH | −CH$_2$OH | 3-(SO$_2$C$_2$H$_4$OSO$_3$H)-phenyl | " | " |
| 4-9 | " | −C$_2$H$_4$OCH$_3$ | " | " | " |

TABLE 2-continued

General formula

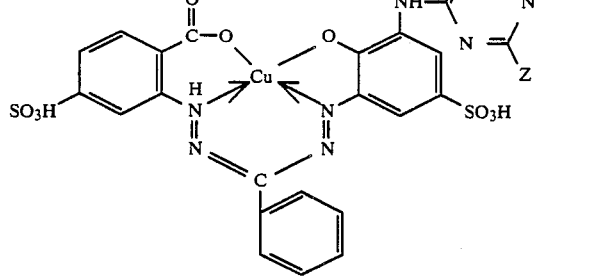

| Examples | —Z | —R | —X—Y | Color tone of cotton cloth | λ max nm(in water) |
|---|---|---|---|---|---|
| 4-10 | —NHCH₂OH | —H | naphthalene with SO₃H and SO₂C₂H₄OSO₃H | blue | 611 |
| 4-11 | —NH—CH—COOH<br>　　　｜<br>　　　CH—C₂H₅<br>　　　｜<br>　　　OH | " | benzene with CH₃, CH₃, SO₂C₂H₄OSO₃H, OCH₃ | " | 610 |
| 4-12 | " | —C₂H₄Cl | benzene with Cl and SO₂C₂H₄OPO₃H | " | 611 |
| 4-13 | —NH—CH—COOH<br>　　　｜<br>　　　CH—C₂H₅<br>　　　｜<br>　　　OH | —C₃H₇(n) | naphthalene with CH₃, SO₂C₂H₄OSO₃H, SO₂C₂H₄OSO₃H | blue | 609 |
| 4-14 | —NH—CH₂—CHCH₂OH<br>　　　　　　｜<br>　　　　　　OH | —H | benzene with SO₂C₂H₄SSO₃H | " | 610 |
| 4-15 | —NHCHCH₂COOH<br>　　　｜<br>　　　COOH | " | benzene with SO₂C₂H₄OSO₃H | " | 605 |

TABLE 2-continued

General formula

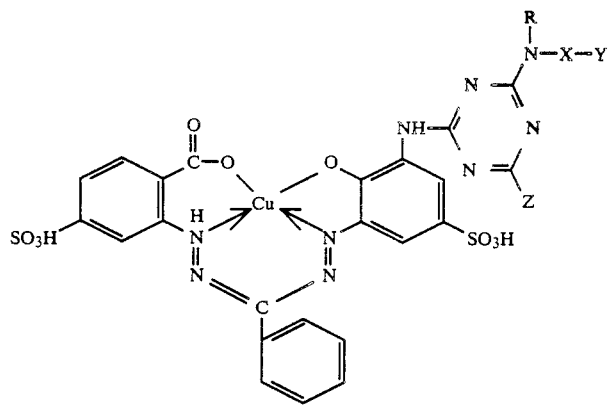

EXAMPLE 5

Example of manufacture 1 molar ratio of the formazan compound having the following structural formula (in the form of free acid):

| Examples | —Z | —R | —X—Y | Color tone of cotton cloth | λ max nm(in water) |
|---|---|---|---|---|---|
| 4-16 | —NHCHCH$_2$COOH<br>     \|<br>     COOH | —CH$_3$ | -⟨benzene⟩-SO$_2$C$_2$H$_4$OSO$_3$H (meta) | blue | 605 |
| 4-17 | " | —H | -⟨benzene⟩-SO$_2$C$_2$H$_4$OCCH$_3$ (para)<br>                               ‖<br>                               O | " | " |
| 4-18 | —NHC$_2$H$_4$SO$_3$H | —CH$_2$OH | -⟨benzene with OCH$_3$⟩-SO$_2$C$_2$H$_4$OSO$_3$H | " | " |
| 4-19 | —N⟨CH$_2$COOH / CH$_2$CH$_2$OH | —H | -⟨benzene⟩-SO$_2$C$_2$H$_4$OSO$_3$H (meta) | blue | 605 |

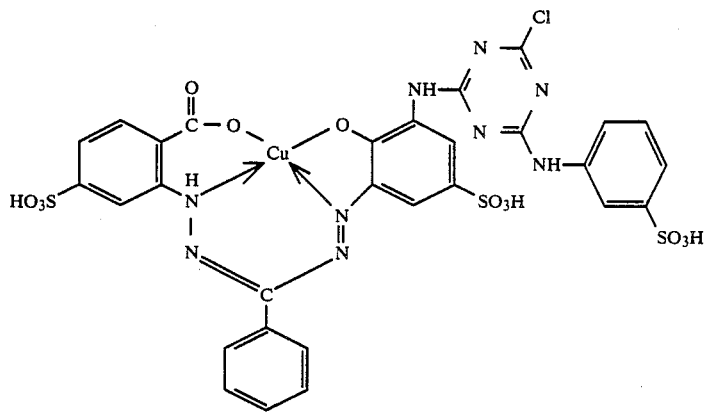

and 1 molar ratio of a compound having the following structural formula:

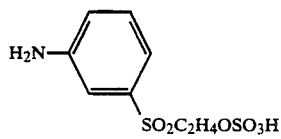

were subjected to condensation in an aqueous medium having a pH value ranging from 4 to 6 and at a temperature of from 80° C. to 90° C. Thereafter, the condensation product was salted out to obtain the water-soluble formazan colorant having the following structural formula (in the form of free acid) and an analytical value obtained by visible light absorption.

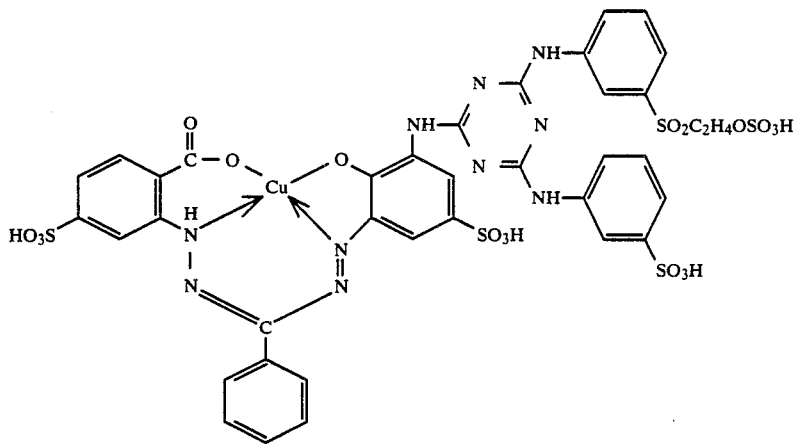

λ max (in water) 608 nm

Example of dyeing

The above-mentioned water-soluble formazan colorant was used as the dyestuff in its respective quantities of 0.2 g, 0.4 g and 0.6 g. Into dye baths, each containing therein the above-mentioned dyestuff added with 16 g of Glauber's salt, 0.4 g of sodium bicarbonate as a buffer and 200 ml of water, there was dipped 10 g of unmercerized cotton knitted fabric, while raising the temperature to 120° C. in 30 minutes, and the dyeing operation was conducted for 60 minutes at the same temperature level. Subsequently, the dyed article was subjected to rinsing, soaping, rinsing and drying, thereby obtaining the dyed article in blue.

The reactive fixing ratio of this colorant to the fibers in this dyeing test was as high as 81%, which was satisfactory, and the build-up property of the colorant on this dyed article was also favorable. Also, the color fastness to light, the color fastness to washing and the acid stability were also excellent, which attained "grade 6", "grade 5−" (in terms of cotton soiling) and "grade 5" (in terms of cotton soiling), respectively.

EXAMPLE 6

A dye bath was prepared by adding, to 200 ml of water, a mixed dyestuff consisting of 0.5 g of the water-soluble formazan colorant which was manufactured in Example 5 above and 0.2 g of well-known anthraquinone dyestuff of the following structural formula for dyeing polyester fibers

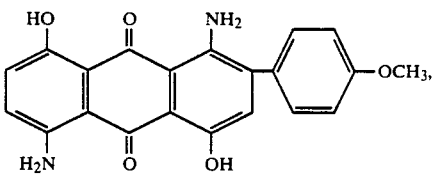

12 g of Glauber's salt, 0.4 g of $Na_2HPO_4.12H_2O$ as a buffer, and 0.1 g of $KH_2PO_4$.

Into this dye bath, 10 g of blended woven cloth consisting of polyester and cotton at a blending ratio of 50 to 50 was immersed, while raising the temperature to 130° C. in 30 minutes, and the dyeing operation was carried out for 60 minutes at the same temperature level. Subsequently, the dyed article was subjected to rinsing, soaping, rinsing and drying, thereby obtaining the dyed article in blue having good homochromaticity. By the way, the pH value of this dye bath was consistently 8 before and after the dyeing.

The dyeing property of each dyestuff in this dyeing test was very satisfactory, and the resulted dyed articles showed very high color density.

EXAMPLE 7 AND COMPRATIVE EXAMPLE 2

The same procedures were followed as in Example 5 above with the exception that the below-mentioned formazan colorants were used in their respective quantities of 0.2 g and 1.2 g.

EXAMPLE 7

The colorant used corresponds to that of Example 5 above, which is as follows.

COMPARATIVE EXAMPLE 2

The colorant used corresponds to a compound of Example 1 in Japanese Unexamined Patent Publication No. 90264/1985, which is as follows.

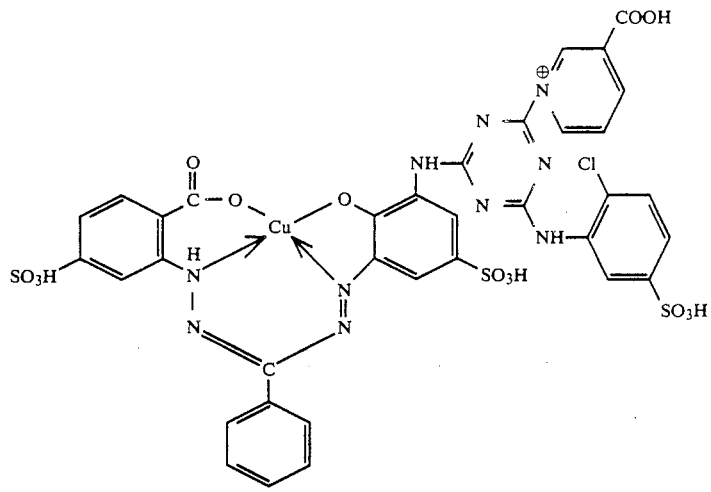

On these dyed cloths, measurements were conducted on their surface reflectance by means of a color difference meter to thereby find out the surface density, and then the build-up property of the dye on these dyed cloths was calculated on the basis of the following equation. The results are shown in Table 3 below.

TABLE 3

|  | Build-up property (%) *1 |
|---|---|
| Example 7 | 402 |
| Comparative Example 2 | 281 |

*1: Build-up property = $\dfrac{\text{Surface density of dyed cloth obtained by using 1.2 g of formazan colorant}}{\text{Surface density of dyed cloth obtained by using 0.2 g of formazan colorant}} \times 100$ (a theoretical value = 600%)

EXAMPLE 8

Water-soluble formazan colorants as shown in Tables 4 and 5 below (represented in the form of free acids)

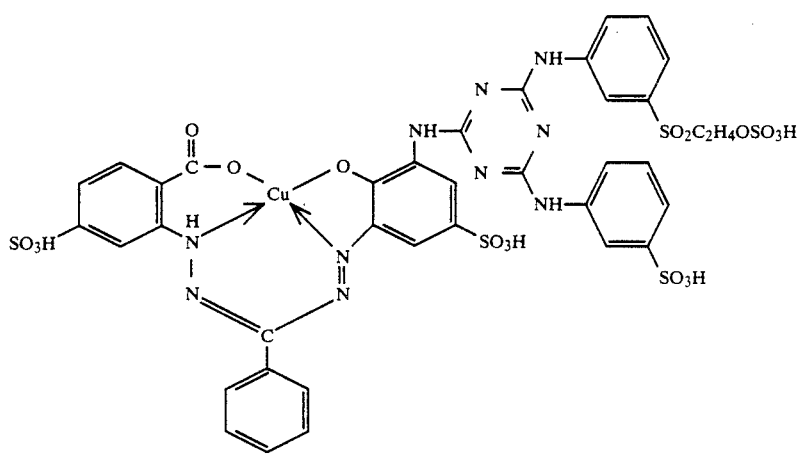

were synthesized in accordance with the method as described in Example 5 above. These colorants were used for dyeing cotton cloth and blended woven cloth of polyester and cotton in accordance with the methods as described in Examples 5 and 6 above. It was found out that these cloth materials had been densely dyed, and the build-up property was also favorable.

Incidentally, the color tone and λmax of the resulted dyed cloth were as shown in Tables 4 and 5 below.

TABLE 4

General formula:

[Structure showing a Cu complex with the substituents R, X, Y, Z as defined in the table]

| Examples | —Z | —R | —X—Y | Color tone of cotton cloth | λ max nm (in water) |
|---|---|---|---|---|---|
| 8-1 | —NH—C₆H₄—SO₃H (para) | —H | phenyl-SO₂C₂H₄OSO₃H (meta) | blue | 608 |
| 8-2 | —NH—C₆H₄—SO₃H (meta) | —C₂H₅ | " | " | 609 |
| 8-3 | —NH—C₆H₃(COOH)₂ | —H | phenyl-SO₂C₂H₄OSO₃H (para) | " | 608 |
| 8-4 | —NH—C₆H₄—SO₃H (meta) | —H | phenyl with CH₃, SO₂C₂H₄OSO₃H, OCH₃ | blue | 609 |
| 8-5 | —NH—C₆H₄—SO₃H (ortho) | " | phenyl-SO₂CH=CH₂ | " | 608 |
| 8-6 | —NH—C₆H₃(COOH)(SO₃H) | " | phenyl with Cl and SO₂C₂H₄OPO₃H | " | 607 |

TABLE 4-continued

General formula:

$$\text{Structure: Cu complex with carboxylate, HO}_3\text{S-substituted benzene ring with NH, N=C(phenyl)-N=N- linkage to second benzene ring bearing OCH}_3\text{, SO}_3\text{H, and NH-triazine group with substituents R, X-Y, Z}$$

| Examples | —Z | —R | —X—Y | Color tone of cotton cloth | λ max nm (in water) |
|---|---|---|---|---|---|
| 8-7 | —NH—(naphthalene-2,4-disulfonic acid, SO$_3$H at 3 and 1 positions) | H | phenyl-SO$_2$C$_2$H$_4$OSO$_3$H | blue | 608 |
| 8-8 | —NH—(naphthalene-1,3-disulfonic acid) | —CH$_2$OH | naphthyl-SO$_2$C$_2$H$_4$Cl, SO$_3$H | " | 609 |
| 8-9 | —NH—(naphthalene-1-sulfonic acid, 7-substituted) | —C$_2$H$_4$OCH$_3$ | phenyl-SO$_2$C$_2$H$_4$OSO$_3$H | " | 608 |
| 8-10 | —NH—(benzene with COOH and SO$_3$H) | —H | phenyl-SO$_2$C$_2$H$_4$OSO$_3$H | blue | 608 |
| 8-11 | —NH—(benzene with two SO$_3$H) | —C$_4$H$_9$ | phenyl with two OCH$_3$ | " | " |

4,985,545

TABLE 5

General formula

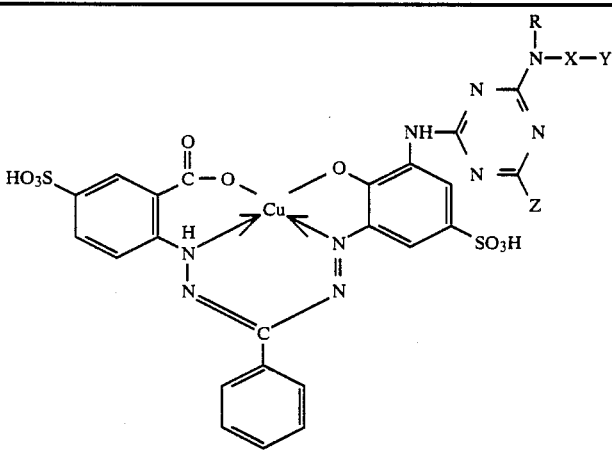

| Examples | —Z | —R | —X—Y | Color tone of cotton cloth | λ max nm (in water) |
|---|---|---|---|---|---|
| 8-12 | 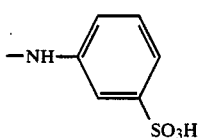 —NH—C6H4—SO3H (meta) | —H |  —C6H4—SO2C2H4OSO3H | blue | 605 |
| 8-13 | 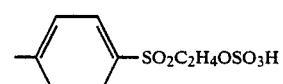 —NH—C6H4—SO3H (para) | " | 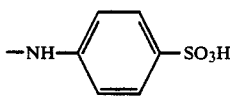 —C6H4—SO2C2H4OSO3H (meta) | " | " |
| 8-14 | 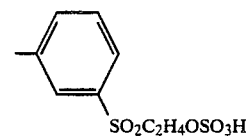 —NH—C6H4(o-SO3H) | —CH3 | 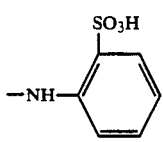 —C6H3(OCH3)(SO2CH=CH2) | " | " |
| 8-15 |  —NH—C6H3(COOH)(SO3H) | —C2H4Cl | 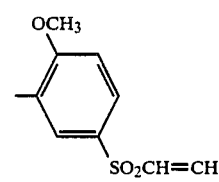 —C6H4—SO2C2H4OSO3H | blue | 605 |
| 8-16 | 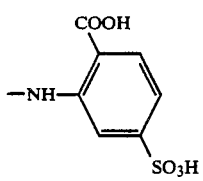 —NH-naphthyl(SO3H)2 | —C3H7(n) |  —C6H4—SO2C2H4Cl | " | 606 |
| 8-17 | 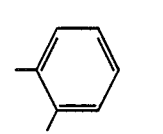 —NH-naphthyl(SO3H)2 | —H | 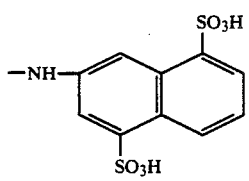 —naphthyl(SO3H)(SO2C2H4OSO3H) | " | " |

EXAMPLE 9

A pad-bath of the following composition was prepared.

| Composition of pad-bath | |
|---|---|
| colorant as described in Example 1 | 80 g |

| -continued | |
| --- | --- |
| Composition of pad-bath | |
| Urea | 100 g |
| Sodium alginate | 1 g |
| Sodium carbonate | 20 g |
| Water | balance |
| Total | 1,000 ml |

Subsequently, cotton broadcloth (#40, mercerized) was dipped in this pad-bath, and, after its pulling out of the bath, the cloth was squeezed at a squeezing ratio of 80%, after which it was subjected to intermediate drying for two minutes at 100° C. Thereafter, the cloth was subjected to fixing treatment for three minutes at 150° C.

Thereafter, it was subjected to rinsing, soaping, rinsing, and drying, thereby obtaining the dyed article in blue.

The dyed article obtained by use of this coloring matter was uniformly and densely dyed. Its color fastness to light (JIS L-0842) was as excellent as "grade 6", its color fastness to washing (JIS L-0844, A-4 Method) was also very excellent, which was as high as "grade 5−" (in terms of cotton soiling), and its color fastness to perspiration and sunlight (JIS L-0888, alkali) showed "grade 5−".

INDUSTRIAL APPLICABILITY

The water-soluble formazan colorant according to the present invention has a novel chemical structure, in which the lower alkylamino group, phenylamino group, or naphthylamino group, which has been substituted with a water-soluble group, is introduced into the triazine ring. This colorant is particularly useful as the dyestuff for cellulosic and nitrogen containing fibers.

And the water-soluble formazan colorant of the present invention having such novel chemical structure possesses its superiority to those well-known colorants, as follows.

(1) The colorant contains the water-soluble groups in good balance throughout the formazan skeletal structure as a whole, which enables the unfixed dyestuff to be easily removed by soaping after the dyeing operation, hence the color fastness of the dyed article to washing is satisfactory.

(2) Since the known dyestuffs has an active halogen atom which is bonded to the triazine ring, the dyed article has poor color fastness to perspiration and sunlight. In contrast to this, the colorant of the present invention has no such an active halogen atom bonded to the triazine ring, hence it has excellent color fastness to perspiration and sunlight.

(3) The colorant of the present invention prossesses highly excellent acid stability in comparison with the known formazan colorants.

(4) The colorant of the present invention has only one vinyl sulfone type reactive group, but its reactive fixing ratio and build-up property are comparable with, or even higher than, those of the known dyestuffs containing therein two reactive groups of the vinyl sulfone type reactive group and the active halogen atom.

(5) The known formazan compounds has a large molecular weight and generally low solubility to water, which made it impossible to carry out high density dyeing, particularly, in the continuous dyeing process. In the case of the colorant according to the present invention, however, it has high solubility to water, hence the high density dyeing is also possible.

What is claimed is:

1. A water-soluble formazan colorant having the following formula (I) in the form of a free acid

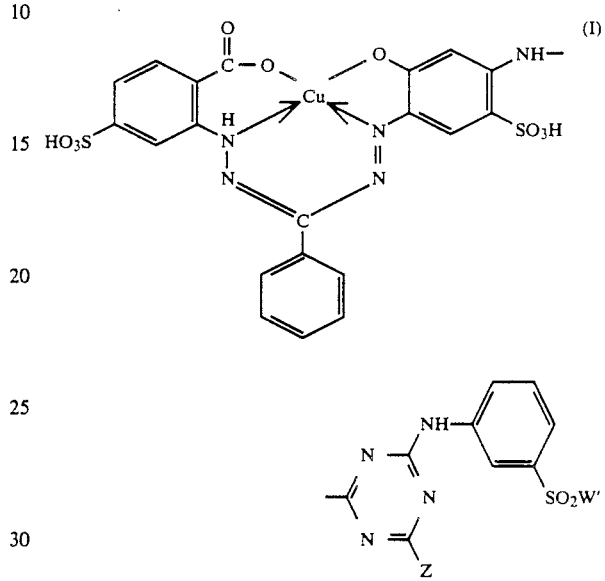

wherein W′ is —CH=CH$_2$ or —C$_2$H$_4$OSO$_3$H, and Z is

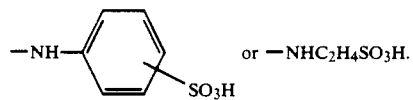   or —NHC$_2$H$_4$SO$_3$H.

2. The water-soluble formazan colorant according to claim 1, wherein in said formula (I), Z is

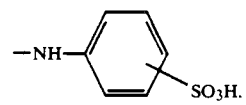

3. The water-soluble formazan colorant according to claim 1, wherein in said formula (I), Z is

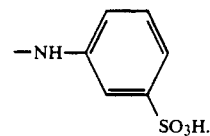

4. The water-soluble formazan colorant according to claim 1, wherein in said formula (I), Z is —NHC$_2$H$_4$SO$_3$H.

* * * * *

UNITED STATES PATENT AND TRADEMARK OFFICE
CERTIFICATE OF CORRECTION

PATENT NO. : 4,985,545

DATED : January 15, 1991

INVENTOR(S) : Kiyoshi HIMENO et al.

It is certified that error appears in the above-identified patent and that said Letters Patent is hereby corrected as shown below:

Column 36, line 10, Formula I,

"  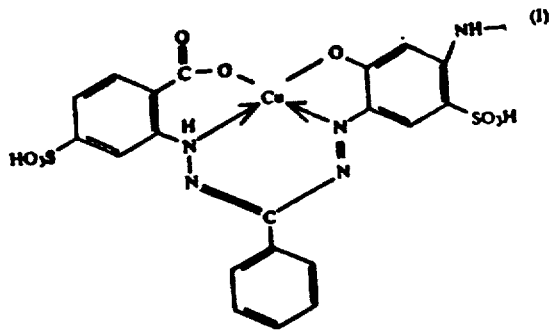  "

UNITED STATES PATENT AND TRADEMARK OFFICE
CERTIFICATE OF CORRECTION

PATENT NO. : 4,985,545

DATED : January 15, 1991

INVENTOR(S) : Kiyoshi HIMENO et al.

It is certified that error appears in the above-identified patent and that said Letters Patent is hereby corrected as shown below:

Should read,

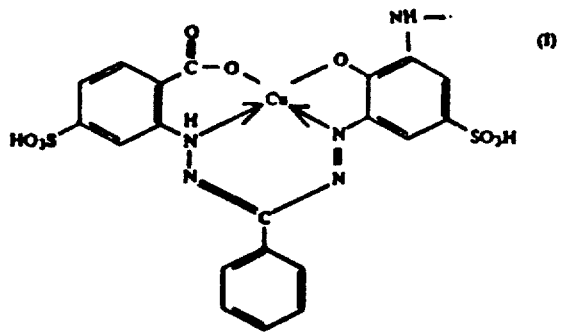

Signed and Sealed this

Twelfth Day of November, 1996

Attest:

BRUCE LEHMAN

Attesting Officer    Commissioner of Patents and Trademarks